United States Patent [19]

Akasofu et al.

[11] Patent Number: 4,631,684

[45] Date of Patent: Dec. 23, 1986

[54] TOOL SUPPORT SYNCHRONIZING SYSTEM FOR NUMERICAL CONTROL APPARATUS

[75] Inventors: Kyosuke Akasofu; Kiyoshi Kuchiki, both of Aichi, Japan

[73] Assignee: Mitsubishi Denki Kabushiki Kaisha, Tokyo, Japan

[21] Appl. No.: 592,205

[22] Filed: Mar. 22, 1984

[30] Foreign Application Priority Data

Mar. 22, 1983 [JP] Japan ................................ 58-47478

[51] Int. Cl.$^4$ .............................................. G05B 19/18
[52] U.S. Cl. .................................... 364/474; 364/131; 901/6
[58] Field of Search ............... 364/131, 133, 134, 474, 364/475, 513, 200 MS File, 900 MS File; 901/6, 7, 8

[56] References Cited

U.S. PATENT DOCUMENTS 4,092,720  5/1978  Carey .................................. 364/474
4,163,183  7/1979  Engleberger et al. ............... 318/569

OTHER PUBLICATIONS

Optimal Programming of Working Cycles for Industrial Robots; Bedini et al; *Transactions of the ASME Journal of Mechanical Design;* vol. 101, Apr. 1979; pp.250–257.

*Primary Examiner*—Jerry Smith
*Assistant Examiner*—Allen MacDonald
*Attorney, Agent, or Firm*—Sughrue, Mion, Zinn, Macpeak and Seas

[57] ABSTRACT

A machine tool with multiple spindles and tool supports operable independently and simultaneously under independent working programs is provided with a tool support synchronizing system to produce synchronized operation of plural tool supports. Each of the working programs produces as a special synchronizing command a predetermined single character or symbol. Control circuits which control the shifting of a respective tool support in response to commands from a respective working program are synchronized with one another in response to the receipt of the special synchronizing command received from the working programs.

7 Claims, 8 Drawing Figures

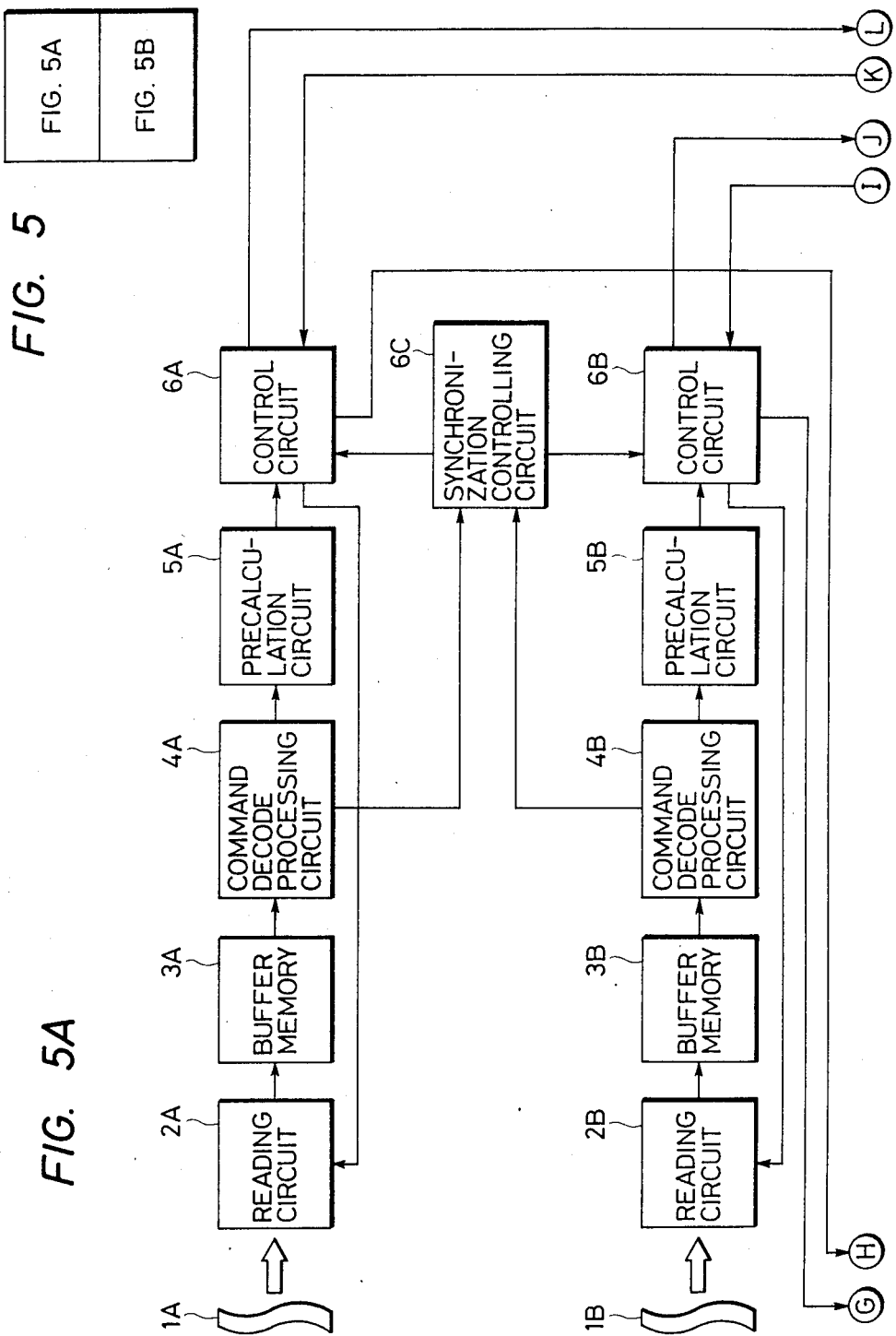

TOOL SUPPORT SYNCHRONIZING SYSTEM FOR NUMERICAL CONTROL APPARATUS

BACKGROUND OF THE INVENTION

The present invention relates to a tool support synchronizing system for a numerical control apparatus of a complex machine tool with multiple spindles in which work programs for a plurality of tool supports are independently and simultaneously executed and the execution of a particular work block is initiated at a designated portion within the programs.

Referring first to FIG. 1, a numerical control apparatus is schematically shown. In FIG. 1, reference numeral 1 designates a tape on which is recorded a program using a known numerical control language; 2, a reading circuit; 3, a buffer memory; 4, a command decode processing circuit; 5, a precalculation circuit; 6, a control circuit; 7, a spindle-shifting-amount outputting circuit; 8, a pulse distribution circuit; 11, a detector; 12, a main-spindle rotation detector; 13, a programmable controller (hereinafter referred to simply as a PC); and 14, a tool machine to be controlled.

In operation, the program content of the tape 1 is read by the reading circuit and temporarily stored in the buffer memory 3, and then decoded by the command decode processing circuit 4. Preprocessing for necessary numerical calculations is executed by the precalculation circuit 5, and the resulting data is transmitted to the control circuit 6, thereby to effect on-line control.

The control circuit 6 outputs the data to the spindle-rotation amount outputting circuit 7 when the data is a spindle shifting command, and to the PC 13 when the data is other than a spindle shifting command. Upon the completion of execution of these commands, the control circuit outputs to the reading circuit 2 a signal for reading the next block in the program. More specifically, the amount of shifting of the spindle of the tool machine 14 is supplied to the spindle-shifting amount outputting circuit 7 for each block of the program 1 to output a pulse from the pulse distribution circuit 8, thereby to actuate the servo unit 9 for shifting the spindle using the motor 10. The detector 11 is mounted on the motor 10 to detect the amount of rotation of the motor 10, and the detected rotation amount is fed back to the servo unit 9 to drive the motor 10 by a predetermined amount. The main-spindle rotation detector 12 is mounted on the main spindle for the purpose of detecting the rotational speed of the rotating workpiece or rotating tool, and the detected rotational speed of the main spindle is fed back to the pulse distribution circuit 8 so as to make the rotational speed of the motor 10 the same as the rotational speed of the main spindle.

The PC 13 is a sequencer used for controlling operations except for the spindle shaft shifting of the tool machine 14 such as oil-pressure control, exchange of tools, and auxiliary control of the spindle. Signals are transmitted between the programmable controller 13 and the control circuit 6 to effect such control operations.

Referring to FIG. 2, the conventional synchronizing system for a numerical control apparatus (hereinafter referred to simply as an NC apparatus) having two tool supports as the tool machine 14 is shown.

In FIG. 2, 1A, 2A, 3A, 4A, 5A, 6A, 7A, 8A, 9A, 10A, 11A and 13A respectively designate a work program, a reading circuit, buffer memory, a command decode processing circuit, a precalculation circuit, a control circuit, a spindle-shifting-amount outputting circuit, a pulse distribution circuit, a servo unit, a motor, a detector, and a PC of a first tool support.

Further in FIG. 2, 1B, 2B, 3B, 4B, 5B, 6B, 10B, 11B and 13B respectively designate a working program, a reading circuit, a buffer memory, a command decode processing circuit, a precalculation circuit, a control circuit, a spindle-shifting-amount outputting circuit, a pulse distribution circuit, a servo unit, a motor, a detector, and a PC of a second tool support.

With this arrangement, a tandem control system composed of two independent control systems is necessary for driving two independent tool supports simultaneously with two independent work programs 1A and 1B.

It has hitherto been the case to use two NC apparatuses with one control system as shown in FIG. 1 for realizing a composite NC apparatus having two control systems as shown in FIG. 2. However, in the case where two tool supports are independently driven by two independent work programs, if there is a possibility of interference of the two tool supports with each other, it is necessary to make the one of the two tool supports wait to prevent such interference. Further, in the case of a balanced cut in which the two tool supports are positioned opposite one another and are moved simultaneously to effect a cutting operation, it is necessary to synchronize the start of movement the two tool supports. To effect this, there has been provided a particular synchronizing command into an auxiliary command (M command) used to make it possible to execute both working programs synchronously.

The conventional synchronizing system will be explained with reference to the following Table 1. In Table 1, M10 designates the synchronizing command. The first and second work programs for the tool supports are shown in left- and right-hand columns, respectively, of the Table.

TABLE 1

| | |
|---|---|
| N001 G28 | N001 G28 |
| N002 S600 T0101 M08 | N002 T0303 |
| N003 G00 X500.0 Z0.0 M0.3 | N003 M10 |
| N004 G01 X-1.0 F1.5 | N004 G00 X0.0 Z1.0 |
| N005 G00 Z1.0 | N005 G01 Z-30.0 F0.4 |
| N006 G00 X480.0 | N006 G00 Z1.0 |
| N007 M10 | N007 G28 |
| N008 G01 Z-200.0 | N008 T0505 |
| N009 G00 X500.0 | N009 G00 X500.0 Z1.0 |
| N010 G00 Z1.0 | N010 G00 X475.0 |
| N011 G00 X475.0 | N011 M10 |
| N012 M10 | N012 G01 Z-195.0 F2.0 |
| N013 G01 Z-195.0 F2.0 | |

As indicated by Table 1, the work program for the first tool support is started simultaneously with the program for the second tool support, and the sequence number (N003) of the work program for the second tool support is synchronized (N007) of the work program for the first tool support. Similarly, the sequence number (N011) of the work program for the second tool support is synchronized with the sequence number (N012) of the work program for the first tool support. FIG. 3 shows a timing chart for the execution of the work programs in Table 1.

With respect to the M command of the work program in the conventional NC apparatus having the construction as shown in FIG. 2, a numerical value subsequent to the M command is converted to BCD code and outputted from the control circuits 6A and 6B to the PCs 13A and 13B. The next work program is executed after receiving a completion signal from the PCs 13A and 13B. Therefore, the synchronizing command M10 is also outputted from the control circuit 6A or 6B to the PC 13A or PC 13B. The PCs 13A and 13B are synchronized with each other in such a manner that one of the PCs 13A and 13B does not output a completion signal to the control circuit during the period from receipt of the synchronizing command M10 to the receipt of the synchronizing signal M10 by the other PC.

Referring to FIG. 4, a relay circuit of the PCs 13A and 13B is shown. in FIG. 4, M10A and M10B are relays actuated in accordance with BCD code decoded from the synchronizing command M10. FINA and FINB are signals fed back to the control circuits 6A and 6B, respectively, of FIG. 2 as completion signals. The FINA and FINB signals are used for obtaining synchronization of the actuation of the relays M10A and M10B. Further in FIG. 4, MFA and MFB are control signals outputted from the control circuits 6A and 6B, respectively, which are low-truth signals outputted from the control circuits slightly later than the BCD code of the M command and the completion signals FINA and FINB from the PCs 13A and PC 13B.

Thus, according to the conventional synchronizing system for tool supports, the auxiliary command (M command) is utilized, and the PCs 13A and 13B effect synchronization control in response to the M command. In such a case, it has been very difficult to make the operating time of the PC 13A the same as that of the PC 13B so that precise synchronization has not been achieved by the conventional synchronizing system. Further, there is a disadvantage in that it is difficult to discriminate the synchronizing M command from the other M commands.

SUMMARY OF THE INVENTION

An object of the present invention is to eliminate the above-mentioned disadvantages of the conventional synchronizing system and to provide precise synchronization of the start of a particular block of a work program.

Another object of the present invention is to provide a tool support synchronizing system in which a plurality of tool supports can be operated simultaneously without interference.

A further object of the present invention is to provide a system in which a synchronizing command code can be easily discriminated from a work program.

In order to achieve the above objects of the present invention, there are provided a particular command code used for synchronization and a synchronization controlling circuit, and an NC apparatus is adapted to read this command code and process it with precise synchronization by programming a synchronizing command at the portion requiring synchronization.

DESCRIPTION OF THE PREFERRED EMBODIMENTS

A preferred embodiment of the present invention will be explained hereinafter.

Figure 1:
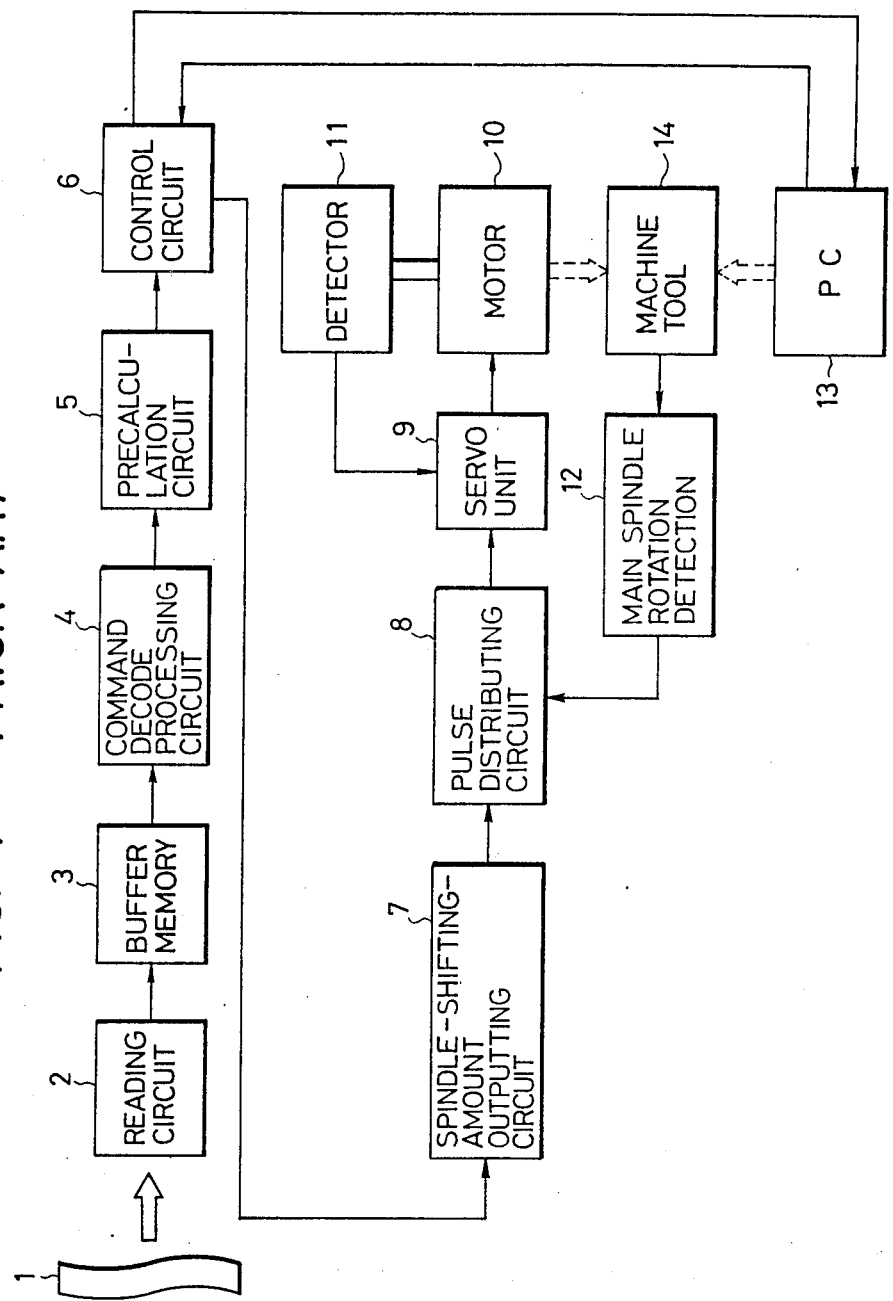
FIG. 1 is a block diagram showing a numerical control apparatus.
Figure 2:
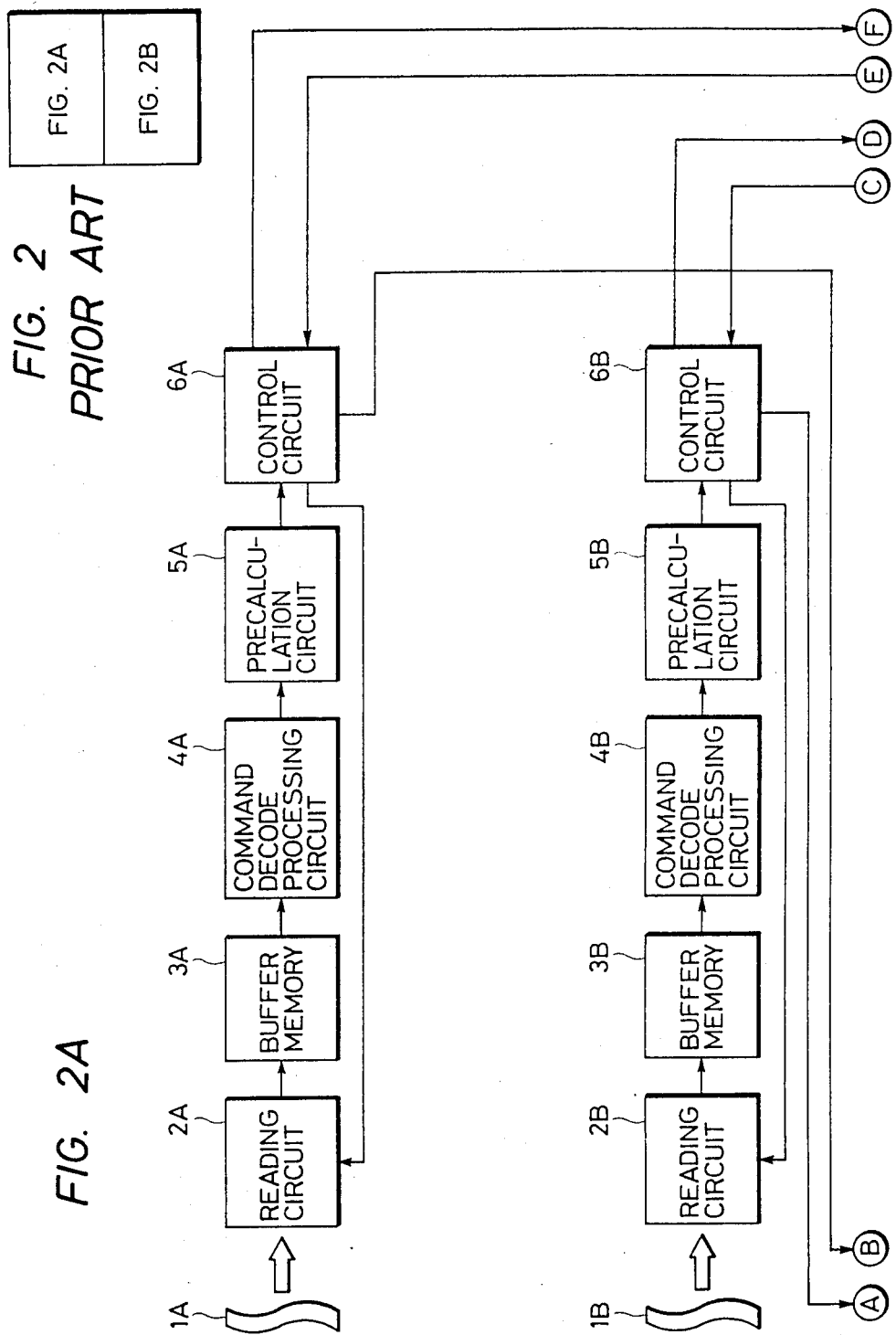
FIG. 2 is a block diagram used for explaining a conventional synchronizing system for a numerical control apparatus with two tool supports.
Figure 2B:
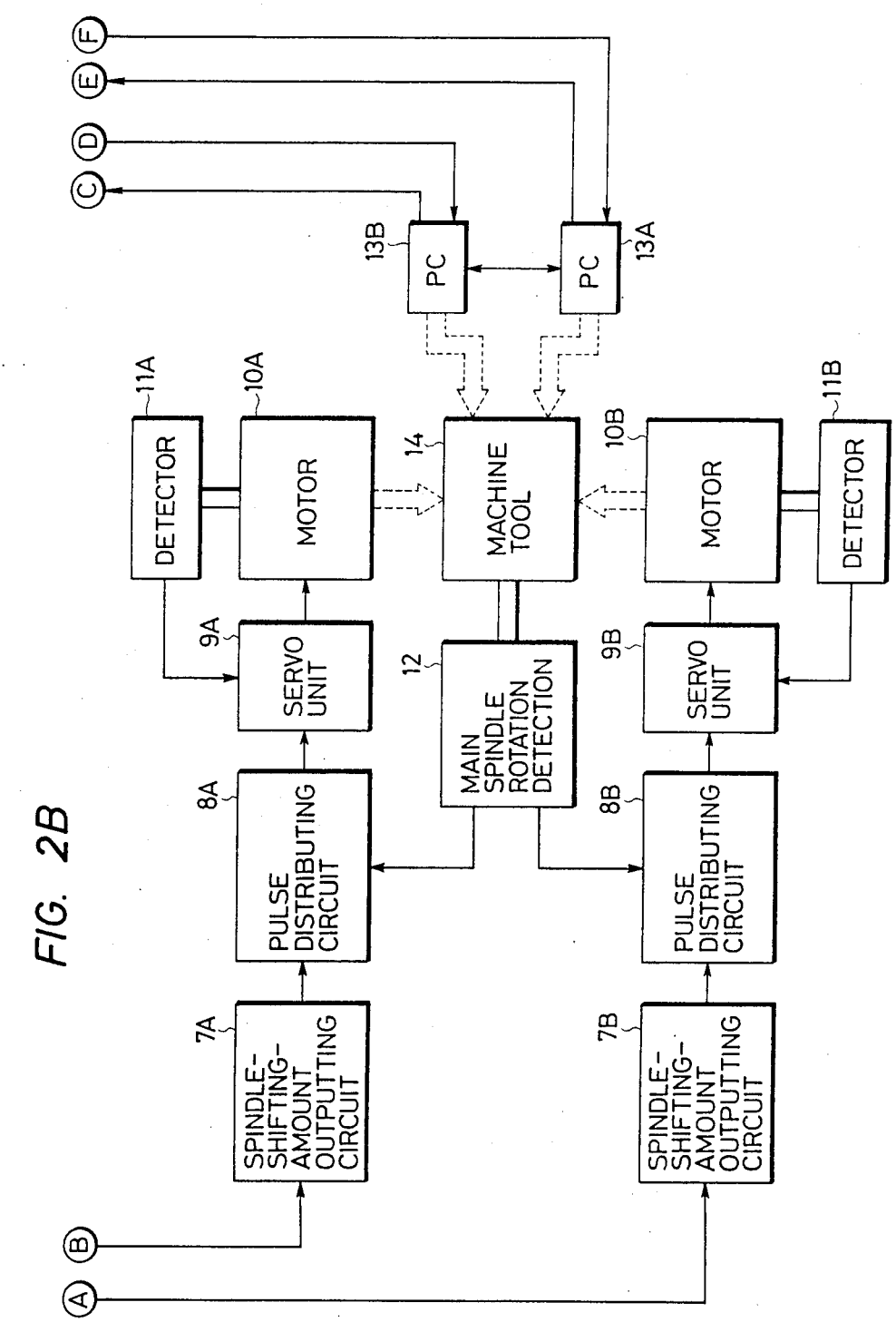
Figure 3:
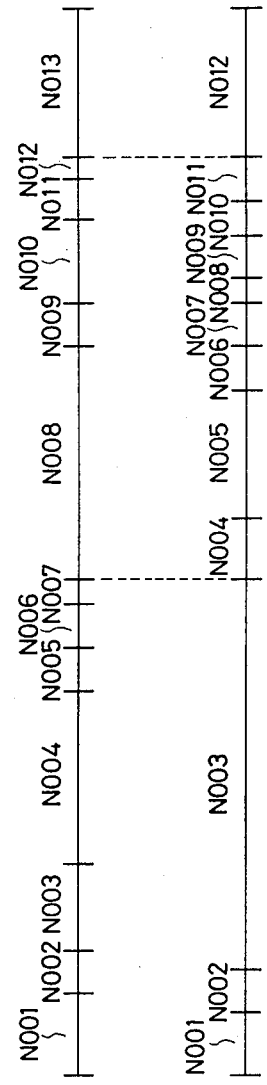
FIG. 3 is a timing chart showing the execution of the work program shown in Table 1 herein.
Figure 4B:
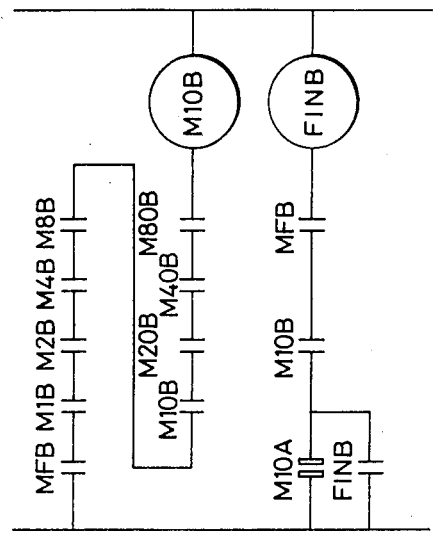
FIGS. 4A and 4B are circuit diagrams showing an example of a programmable controller (PC) used as a relay circuit.
Figure 4A:
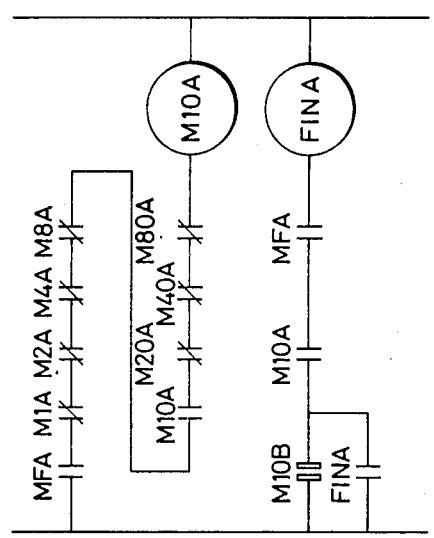
Figure 5B:
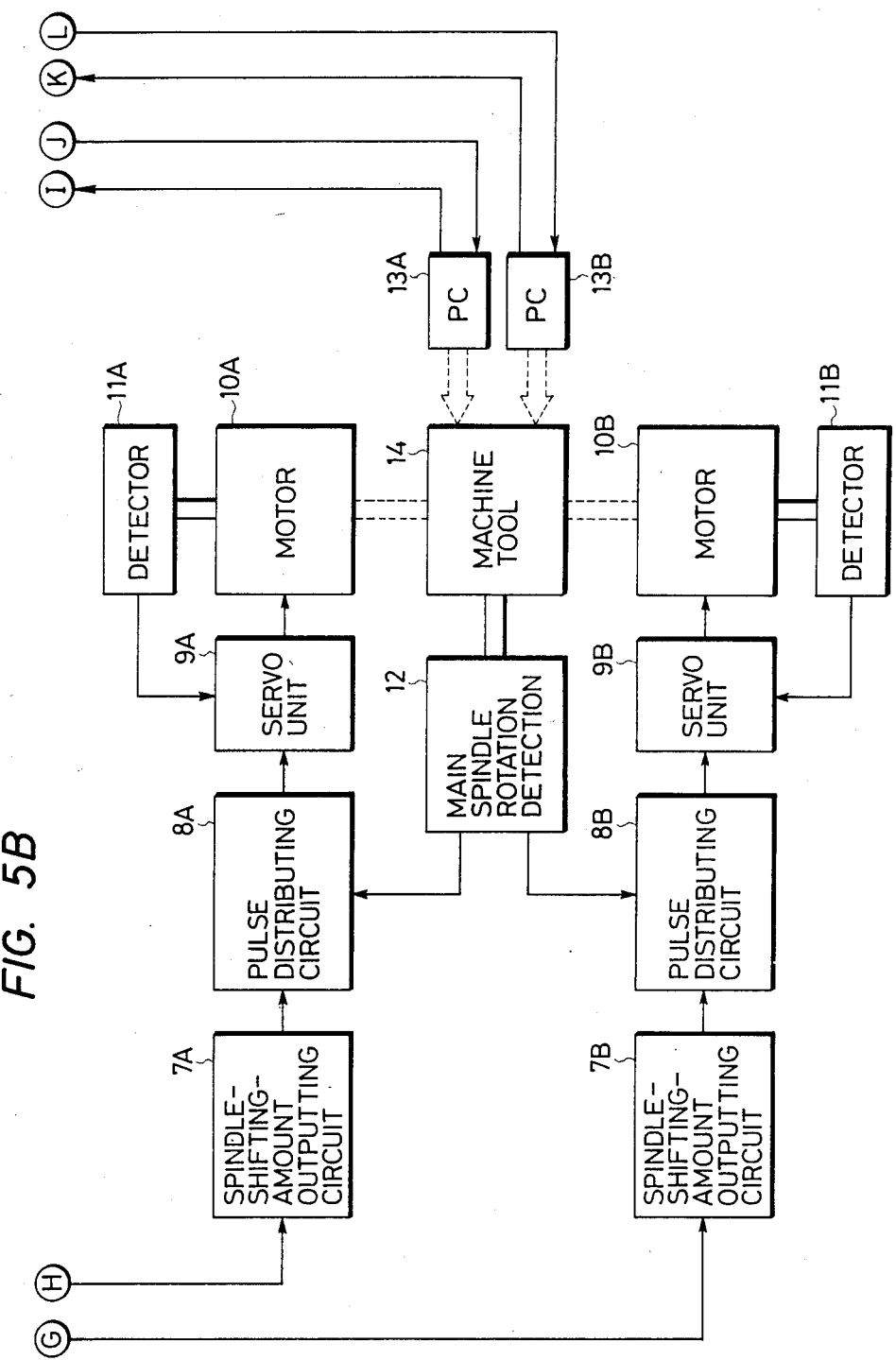
FIG. 5 is a block diagram of a preferred embodiment of a numerical control apparatus of the present invention.
Figure 6:
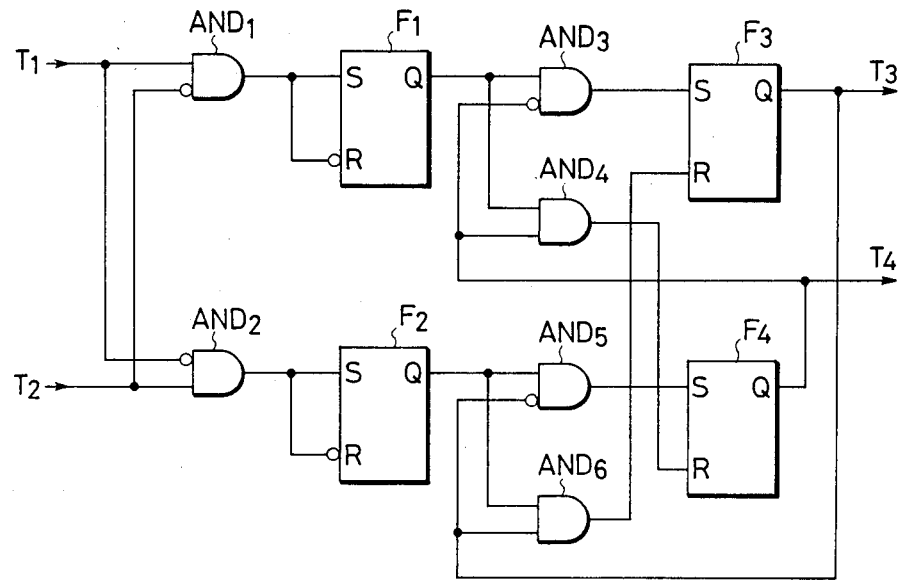
FIG. 6 is a block diagram showing in detail the synchronization control circuit of FIG. 5.

FIG. 5 is a block diagram showing a preferred embodiment of a numerical control apparatus of the invention, in which 6C denotes a synchronization controlling circuit, a detailed example of which is shown in FIG. 6. According to the present invention, a synchronizing command composed of one character or symbol, such as "!", is used, which synchronizing command is not used in the conventional work program.

Referring to the following Table 2, an example of a work program using the synchronizing command "!" is shown. Similar to Table 1, the first and second work programs for two tool supports are shown in left- and right-hand columns, respectively.

TABLE 2

| | |
|---|---|
| N001 G28 | N001 G28 |
| N002 S600 T0101 M08 | N002 T0303 |
| N003 S00 X500.0 Z0.0 M03 | N003 ! |
| N004 G01 X-1.0 F1.5 | N004 G00 X0.0 Z1.0 |
| N005 G00 Z1.0 | N005 G01 Z-30.0 F0.4 |
| N006 G00 X480.0 | N006 G00 Z1.0 |
| N007 ! | N007 G28 |
| N008 G01 Z-200.0 | N008 T0505 |
| N009 G00 X500.0 | N009 G00 X500.0 Z1.0 |
| N010 G00 Z1.0 | N010 G00 X475.0 |
| N011 G00 X475.0 | N011 ! |
| N012 ! | N012 G01 Z-195.0 F2.0 |
| N013 G01 Z-195.0 F2.0 | |
| . | . |
| . | . |

In FIG. 6, $AND_1$ to $AND_6$ are AND gates, and $F_1$ to $F_4$ are flip-flops storing flags awaiting execution. $T_1$ is an input terminal for receiving the pulse-like signal of the synchronizing command "!" for the work program of the first tool support outputted from the command decoding circuit 4A in FIG. 5, $T_2$ is an input terminal receiving the pulse-like signal of the synchronizing command "!" of the work program of the second tool support outputted from the command decoding circuit 4B in FIG. 5, and $T_3$ and $T_4$ are output terminals for the synchronization controlling signals outputted to the control circuits 6A and 6B of FIG. 5. A "0" on the output terminals $T_3$ and $T_4$ means execution and a "1" means awaiting execution.

Assuming that the work program for the first tool support shown in Table 2 is executed simultaneously with the work program for the second tool support, the pulse-like signal is applied to the input terminal $T_2$ from the command decoding processing circuit 4B in FIG. 5 by the synchronizing command "!" of the sequence number (N003) of the work program of the second tool support. In FIG. 6, when the signal on the terminal $T_2$ is in the ON-state, the terminal $T_1$ is in the OFF-state, and therefore the AND gate $AND_2$ outputs a "1" and the flip-flop $F_2$ is set thereby to make the output Q "1". At this time, the output $T_3$ of the flip flop $F_3$ is "0" and the work program of the first tool support is being executed so that the AND gate AND₅ outputs a "1" and the flip-flop F₄ is set. The signal on the output terminal T₄ is thus set to "1", thereby to place the execution of the work program of the second tool support in the waiting state.

Then, the next program of the first tool post is sequentially executed up to the sequence number (N007), whereupon the pulse-like signal is applied to the terminal T₁ of FIG. 6 from the command decoding processing circuit 4A of FIG. 5 by the synchronizing command "!". In FIG. 6, when the signal on the terminal T₁ is ON, the signal on the terminal T₂ is OFF so that the AND gate AND₁ outputs a "1" and the flip-flop F₁ is set, thereby to output from the terminal Q thereof a "1". At the same time, the output T₄ of the flip-flop F₄ is a "1" and the work program for the second tool support is held in the waiting state so that the AND gate AND₃ outputs a "0", the AND gate AND₄ outputs a "1", and the flip-flop F₄ is reset so that its output T₄ is a "0", thereby releasing the waiting state of the work program of the second tool post. This is entirely similar to the case where the synchronization waiting command is programmed in the work program for the first tool post prior to the work program for the second tool post.

In this manner, according to the present invention, synchronization control can be performed by having one of the two tool supports put in a waiting state and then starting its operation from a desired time instant in synchronism with the other.

As mentioned above, in the command decoding circuits 4A and 4B of FIG. 5, it is necessary to provide the decoding circuit for decoding the particular synchronizing command code "!" and the pulse generating circuit for generating a pulse signal upon decoding the synchronizing command code "!".

Figure 7:
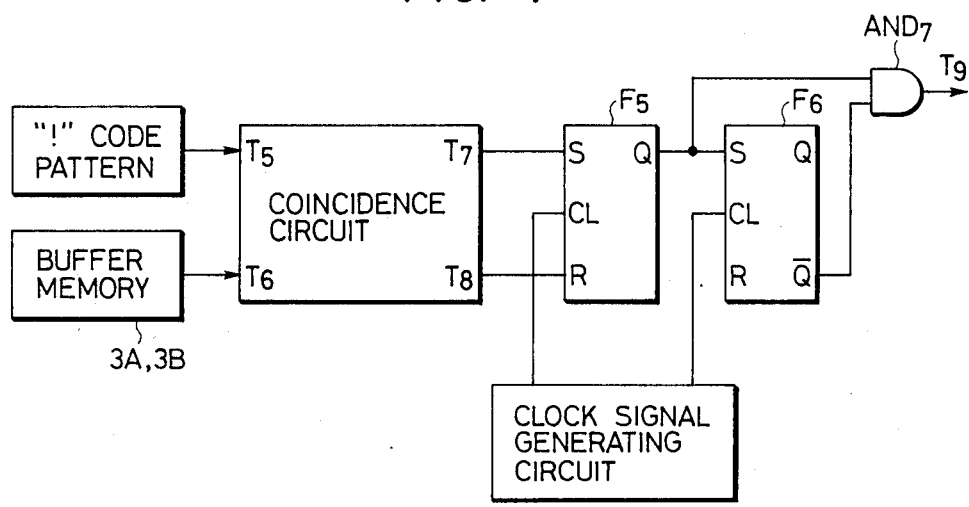
FIG. 7 is a circuit diagram showing an example of a command decode circuit in FIG. 5.

Referring now to FIG. 7, an embodiment of the command decoding circuit 4A is shown. In FIG. 7, the code pattern "!" is supplied to the input terminal T₅ of the coincidence circuit, to the other terminal T₆ thereof of which the work program code inputted from the buffer memories 3A and 3B in FIG. 5 is applied. The coincidence circuit outputs "1" to the terminal T₇ upon coincidence of the two inputs, and outputs "1" to the terminal T₈ when coincidence is not established. The outputs of the flip-flops F₅ and F₆ and the AND gate AND₇ are "1" during the synchronization period of the clock signal applied to the input terminal CL of the flip-flop F₅ and F₆ when the output from the terminal T₇ becomes "1".

Further, with the present invention, it is necessary to provide in the controlling circuits 6A and 6B shown in FIG. 5 a circuit which defers the issuance of the subsequent block reading signal applied to the reading circuits 2A and 2B in FIG. 5 in response to the control signal outputted from the synchronization controlling circuit in FIG. 6. Such can be realized by a simple circuit composed of a single AND gate.

In the above embodiment, the synchronizing command code "!" is used as a synchronizing command, but the present invention is not limited to any particular character or symbol, and a symbol such as "#" which is distinctive from the others used in the work program can be used. Further, the number of tool supports may be more than two.

As is apparent from the above descriptions, the present invention has an advantage that initiation of blocks of the work program can be precisely synchronized with the initiation of other program blocks since a code composed of a single character or symbol is used as a synchronizing command, a control circuit is provided with a synchronizing controller, and each tool support is driven in accordance with the work program after the synchronizing command within each work program is detected.

We claim:

1. In a tool post synchronizing system for a numerical control apparatus for controlling a tool machine having a plurality of tool supports through control circuitry, a tool support synchronizing system for said numerical control apparatus comprising:
   reading means provided for each tool support for reading an independent work program for controlling each of said tool supports;
   command decode processing means for decoding commands of said independent work programs read by said reading means to output a signal;
   control circuit means for controlling shifting means for shifting said tool supports in accordance with said signal from said command decode processing means; and
   synchronization controlling means for controlling said control circuit means and guiding execution of said independent work programs in synchronization with one another when said command decode processing means decodes a synchronizing command from said independent work programs and composed of a predetermined single character or symbol in the form of a mark not usually used in said independent work programs;
   wherein said command decode processing means comprises a coincidence circuit for sensing the coincidence of a code pattern with said synchronizing command, an output of said coincidence circuit representing coincidence being supplied to said synchronization controlling means,
   wherein said control circuitry comprises a programmable controller coupled to said central circuit means for controlling an auxiliary function of said tool machine; and wherein said synchronization controlling means includes means for preventing execution of the shifting of a tool support during a period from receipt of a synchronizing command of the work program for said tool support until detection of a synchronizing command of a work program for another tool support.

2. The tool post synchronizing system for a numerical control apparatus according to claim 1, wherein said predetermined character or symbol is "!".

3. The tool post synchronizing system for a numerical control apparatus according to claim 1, wherein said predetermined character or symbol is "#".

4. The tool post synchronizing system for a numerical control apparatus according to claim 1, further comprising a precalculating circuit connected between said command decode processing means and said control circuit.

5. The tool post synchronizing system for a numerical control apparatus according to claim 1, wherein said auxiliary function is oil pressure control of said tool machine.

6. The tool post synchronizing system for a numerical control apparatus according to claim 1, wherein said auxiliary function is tool exchange.

7. The tool post synchronizing system for a numerical control apparatus according to claim 1, wherein said auxiliary function is spindle control.

* * * * *